United States Patent
Coleman

(10) Patent No.: US 12,350,122 B1
(45) Date of Patent: Jul. 8, 2025

(54) ORTHODONTIC DEVICE FOR LATERAL TOOTH MOVEMENT

(71) Applicant: Grant G. Coleman, Charlotte, NC (US)

(72) Inventor: Grant G. Coleman, Charlotte, NC (US)

( * ) Notice: Subject to any disclaimer, the term of this patent is extended or adjusted under 35 U.S.C. 154(b) by 406 days.

(21) Appl. No.: 17/574,136

(22) Filed: Jan. 12, 2022

Related U.S. Application Data

(60) Provisional application No. 63/136,839, filed on Jan. 13, 2021.

(51) Int. Cl.
*A61C 7/22* (2006.01)
*A61C 7/14* (2006.01)

(52) U.S. Cl.
CPC . *A61C 7/22* (2013.01); *A61C 7/14* (2013.01)

(58) Field of Classification Search
CPC .... A61C 7/14; A61C 7/28; A61C 7/20; A61C 7/22
See application file for complete search history.

(56) References Cited

U.S. PATENT DOCUMENTS

| | | | |
|---|---|---|---|
| 3,127,677 A | 4/1964 | Schachter | |
| 3,508,332 A | 4/1970 | Armstrong | |
| 3,835,538 A | 9/1974 | Northcutt | |
| RE29,686 E * | 7/1978 | Wallshein | A61C 7/12 433/18 |
| 4,187,610 A | 2/1980 | Ziegler | |
| 4,256,456 A | 3/1981 | Wallshein | |
| 4,869,667 A | 9/1989 | Vardimon | |
| 5,035,614 A | 7/1991 | Greenfield | |
| 5,112,221 A | 5/1992 | Terry | |
| 5,131,843 A * | 7/1992 | Hilgers | A61C 7/20 433/20 |
| 5,246,366 A | 9/1993 | Tracey | |
| 5,263,859 A | 11/1993 | Kesling | |
| 5,312,247 A | 5/1994 | Sachdeva et al. | |
| 5,474,444 A * | 12/1995 | Wildman | A61C 7/12 433/18 |
| 5,545,037 A | 8/1996 | Takeshi | |
| 5,697,782 A | 12/1997 | Klapper et al. | |

(Continued)

OTHER PUBLICATIONS

ScienceDirect, Orthodontic Brackets (Year: 2023).*

*Primary Examiner* — Cris L. Rodriguez
*Assistant Examiner* — Sydney J Pulvidente
(74) *Attorney, Agent, or Firm* — Tillman, Wright & Wolgin; James D. Wright; David R. Higgins

(57) ABSTRACT

An orthodontic system having a plurality of orthodontic brackets, an archwire, and a closed loop formed from a metal wire having elastic properties. The brackets include first and second brackets attached to first and second teeth in an upper jaw or a lower jaw. The archwire is arranged around the jaw and coupled to the first and second brackets. The loop has first and second ends and a plurality of lobe pairs, each including an upper lobe and a lower lobe, arranged between the first and second ends. The first end of the loop is hooked around the first bracket. The second end of the loop is stretched and hooked around the second bracket, placing the loop in tension between the first and second brackets. Each successive lobe pair of the plurality of lobe pairs defines a loop segment that is positioned around a successive bracket along the first jaw.

20 Claims, 4 Drawing Sheets

(56) References Cited

U.S. PATENT DOCUMENTS

| | | | |
|---|---|---|---|
| 5,846,074 A | 12/1998 | Klapper | |
| 5,885,074 A * | 3/1999 | Hanson | A61C 7/30 433/15 |
| 6,217,324 B1 | 4/2001 | Kesling | |
| 6,273,713 B1 | 8/2001 | Liou | |
| 6,280,186 B1 * | 8/2001 | Logan | A61C 7/303 433/18 |
| 7,335,021 B2 | 2/2008 | Nikodem | |
| 10,123,855 B1 | 11/2018 | Coleman | |
| 10,433,935 B1 | 10/2019 | Coleman | |
| 2003/0068595 A1 | 4/2003 | Pitnick et al. | |
| 2003/0180689 A1 * | 9/2003 | Arx | A61C 5/007 433/18 |
| 2005/0064359 A1 | 3/2005 | Nikodem | |
| 2006/0068354 A1 | 3/2006 | Jeckel | |
| 2006/0073434 A1 * | 4/2006 | Reynolds | A61C 7/303 433/18 |
| 2007/0196781 A1 | 8/2007 | Cope | |
| 2008/0138759 A1 | 6/2008 | Kravitz et al. | |
| 2008/0182219 A1 | 7/2008 | Spalty | |
| 2008/0268398 A1 * | 10/2008 | Cantarella | A61C 7/20 433/20 |
| 2009/0197216 A1 | 8/2009 | Miller | |
| 2010/0178628 A1 | 7/2010 | Kim | |
| 2010/0307511 A1 | 12/2010 | Meade | |
| 2011/0269094 A1 | 11/2011 | Shearer | |
| 2012/0058444 A1 | 3/2012 | Allesee | |
| 2012/0202162 A1 | 8/2012 | Hilgers et al. | |
| 2013/0149659 A1 | 6/2013 | Garnett | |
| 2014/0242536 A1 | 8/2014 | Ziehmer | |
| 2014/0272760 A1 | 9/2014 | Cameron et al. | |
| 2015/0257858 A1 | 9/2015 | Dischinger | |
| 2018/0021108 A1 * | 1/2018 | Cinader, Jr. | A61C 7/14 433/10 |
| 2018/0221113 A1 * | 8/2018 | Tong | A61C 7/28 |
| 2022/0125555 A1 * | 4/2022 | Carriere Lluch | A61C 7/30 |

* cited by examiner

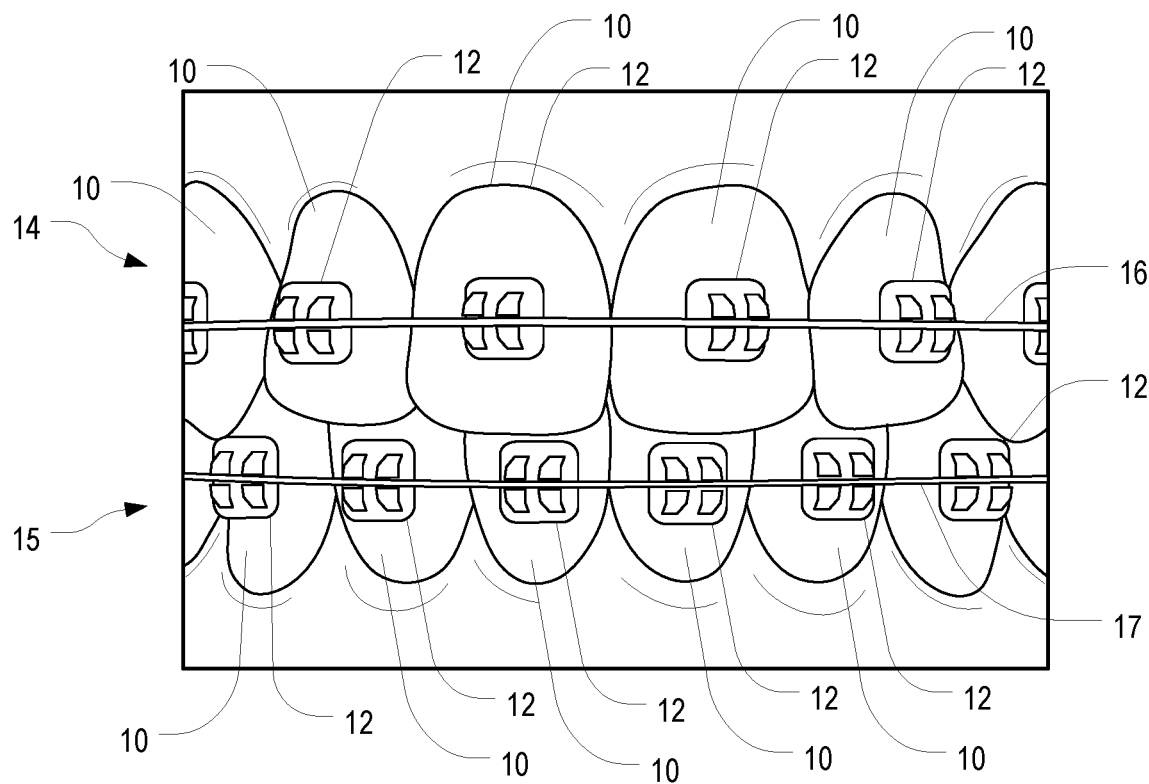
FIG. 1  *prior art*
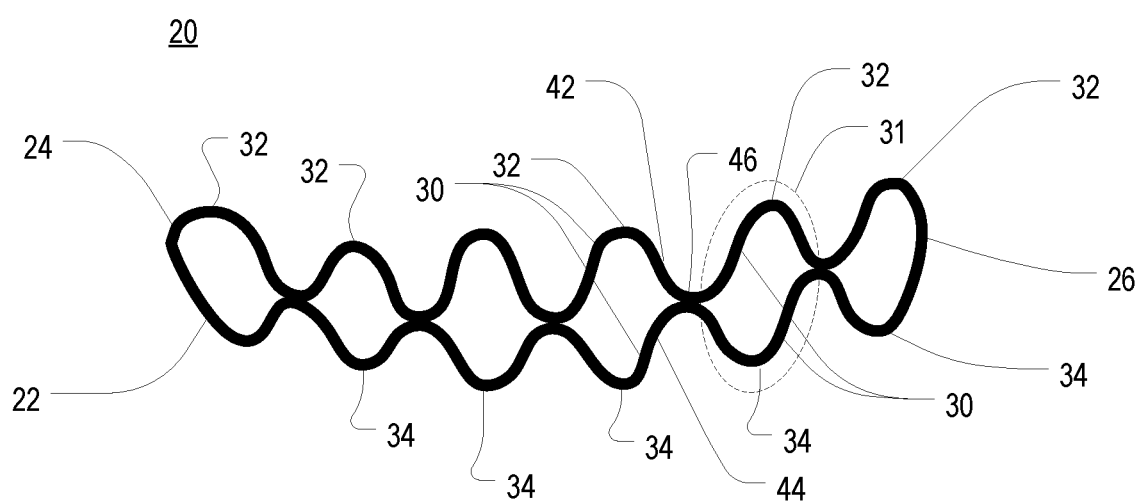
FIG. 2

ORTHODONTIC DEVICE FOR LATERAL TOOTH MOVEMENT

CROSS-REFERENCE TO RELATED APPLICATION

The present application is a U.S. nonprovisional patent application of, and claims priority under 35 U.S.C. § 119(e) to, U.S. provisional patent application Ser. No. 63/136,839, filed Jan. 13, 2021 and entitled "ORTHODONTIC DEVICE FOR LATERAL TOOTH MOVEMENT," which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to orthodontics, and, in particular, to orthodontic devices for lateral movement of malpositioned teeth.

Background

Orthodontics is the science of moving teeth within the mouth by the application of force to the teeth over time. Generally, the goal of orthodontic treatment is to ideally align the upper and lower teeth within their respective arches and jaws so that the teeth are both esthetically pleasing in appearance, and so that they also fit together in the anatomically prescribed ideal positions. In this regard, FIG. 1 is a front view of portions of an exemplary prior art orthodontic system installed on upper and lower dental arches. The orthodontic system includes orthodontic brackets 12 attached to the teeth 10 in both the upper dental arch 14 and the lower dental arch 15, an upper archwire 16 routed around the brackets 12 in the upper dental arch 14, and a lower archwire 17 routed around the brackets 12 in the lower dental arch 15.

A common condition addressed via orthodontics is the presence of excessive spacing between one or more teeth within the upper or lower dental arch. In such situations, the orthodontist typically must close these spaces in order to establish ideal dental esthetics and to establish a correct fit of the bite.

The most common orthodontic method of closing spacing between teeth involves the placement of some sort of rubber or elastomeric "chain" (i.e., a linked series of loops) over the orthodontic brackets that are attached to the teeth. This elastomeric chain is stretched from its original length as it is placed over the orthodontic brackets, and as it shrinks or contracts back toward its original, unstretched, length it applies compressive force to the teeth in order to slide one or more teeth/brackets along the orthodontic archwire, bringing the teeth together and closing any spaces that are present between them.

This elastomeric chain initially applies a very high level of force to the teeth. However, due to distortion of the elastomeric material as it is stretched, the force level that is applied decreases very rapidly (over only a few days to weeks) after installation as the involved teeth begin to move. The applied force continues to decline until the elastomeric chain becomes passive, no longer exerting force levels sufficient to effectuate tooth movement. This necessitates frequent replacement of the elastomeric chain by the orthodontist in order to apply additional forces to the teeth so as to cause tooth movement to continue to occur. This presents a problem in that the patient must return to the orthodontist frequently for replacement of the elastomeric chain.

In addition, due to the porous nature of the elastomeric chain material, bacterial dental plaque readily accumulates on its surface, increasing the risk of damage to the patient's tooth enamel over time.

Still further, multiple orthodontic studies have confirmed that teeth move the most comfortably and efficiently when the applied orthodontic force is both light and continuous. The aforementioned method of orthodontically closing space between teeth applies heavy, inconsistent, forces to teeth, which has been shown to increase patient discomfort, results in slower tooth movement, and increases the risk of damage to the involved teeth roots.

Thus, in order to provide a more efficient, less-painful, and biologically safer method of closing space between teeth, a need exists for a device designed to allow application of a lighter, steadier, force to the teeth over time with less need for reactivation or replacement by the orthodontist. If such a device were to be smoother and less porous than elastomeric chain, it would also be more resistant to the adherence of bacterial dental plaque to it surface, thus reducing the risk of enamel damage to the patient.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of lateral tooth movement, the present invention is not limited to use only in lateral tooth movement, as will become apparent from the following summaries and detailed descriptions of aspects, features, and one or more embodiments of the present invention.

Broadly defined, the present invention according to one aspect relates to an orthodontic system, including: a plurality of orthodontic brackets, including a first bracket that is attached to a first tooth in a first jaw, the first jaw being an upper or lower jaw, and a second bracket that is attached to a second tooth in the first jaw; an archwire that is arranged around the first jaw and coupled to the first and second brackets; and a closed loop that is formed from a metal wire having elastic properties, wherein the loop has a first end, a second end, and a plurality of lobe pairs arranged along a length between the first and second ends, wherein each lobe pair includes an upper lobe and a lower lobe; wherein the first end of the loop is hooked around the first bracket, wherein the second end of the loop is stretched and hooked around the second bracket, placing the loop in tension between the first and second brackets, and wherein each successive lobe pair of the plurality of lobe pairs defines a loop segment that is positioned around a successive bracket, of the plurality of orthodontic brackets, along the first jaw.

In a feature of this aspect, the loop has an upper half and a lower half, wherein the upper lobes are all arranged in the upper half of the loop in a continuous run of the elastic metal wire from the first end to the second end, and wherein the lower lobes are all arranged in the lower half of the loop in a continuous run of the elastic metal wire from the first end to the second end. In further features, lowermost portions of the upper lobes approach uppermost portions of the lower lobes but do not make contact with or cross over each other; lowermost portions of the upper lobes make contact with uppermost portions of the lower lobes but do not cross over each other; lowermost portions of the upper lobes slightly overlap uppermost portions of the lower lobes; and/or the upper and lower halves of the loop are symmetric relative to one another.

In another feature of this aspect, an upper portion of the elastic metal wire is arranged to cross over a lower portion of the elastic metal wire in at least one location along the loop, and each pair of upper and lower portions defines a respective one of the lobe pairs. In a further feature, the two continuous runs of the elastic metal wire are symmetric relative to one another.

In another feature of this aspect, the first and second ends of the loop are connected by two continuous runs of the elastic metal wire, and the two continuous runs alternately cross over each other such that a first of the two continuous runs forms the upper lobe of a first lobe pair and the lower lobe of a second lobe pair that is immediately adjacent the first lobe pair, such that a second of the two continuous runs forms the lower lobe of the first lobe pair and the upper lobe of the second lobe pair. In a further feature, the two continuous runs of the elastic metal wire are symmetric relative to one another.

In another feature of this aspect, the plurality of lobe pairs includes at least (i) a first lobe pair, defining a first loop segment, positioned around the first bracket, (ii) a second lobe pair, defining a second loop segment, positioned around the second bracket, and (iii) a third lobe pair, defining a third loop segment, positioned around a third bracket located between the first and second brackets. In further features, a pitch between the first loop segment and the second loop segment is the same as a pitch between the second loop segment and the third loop segment; a pitch between each loop segment and the loop segment adjacent thereto is the same; and/or the plurality of lobe pairs includes between four and eight lobe pairs, inclusive.

In another feature of this aspect, the metal wire is formed from a nitinol alloy. In a further feature, the metal wire is formed from a copper-nitinol alloy.

In another feature of this aspect, the metal wire is formed from a shape-memory alloy.

In another feature of this aspect, the closed loop exerts 1-300 g of pull force as it collapses from a stretched or "active" state back to an inactive state. In further features, the closed loop exerts approximately 20-200 g of pull force as it collapses from its stretched or "active" state back to its inactive state; and/or the closed loop exerts approximately 40-100 g of pull force as it collapses from its stretched or "active" state back to its inactive state.

Broadly defined, the present invention according to another aspect relates to an orthodontic device for use in an orthodontic system, the orthodontic system having a plurality of orthodontic brackets including a first bracket attached to a first tooth and a second bracket attached to a second tooth, the first and second teeth being in either the upper jaw or the lower jaw, and an archwire that is arranged around the first jaw and coupled to the first and second brackets, the orthodontic device including: a closed loop that is formed from a metal wire having elastic properties, wherein the loop has a first end, a second end, and a plurality of lobe pairs arranged along a length between the first and second ends, wherein each lobe pair includes an upper lobe and a lower lobe; wherein the first end of the loop is adapted to be hooked around the first bracket, wherein the second end of the loop is adapted to be stretched and hooked around the second bracket, placing the loop in tension between the first and second brackets, and wherein each successive lobe pair of the plurality of lobe pairs defines a loop segment that is adapted to be positioned around a successive bracket, of the plurality of orthodontic brackets, along the first jaw when the loop is stretched between the first and second brackets.

In a feature of this aspect, the loop has an upper half and a lower half, the upper lobes are all arranged in the upper half of the loop in a continuous run of the elastic metal wire from the first end to the second end, and the lower lobes are all arranged in the lower half of the loop in a continuous run of the elastic metal wire from the first end to the second end. In further features, lowermost portions of the upper lobes approach uppermost portions of the lower lobes but do not make contact with or cross over each other; lowermost portions of the upper lobes make contact with uppermost portions of the lower lobes but do not cross over each other; lowermost portions of the upper lobes slightly overlap uppermost portions of the lower lobes; and/or the upper and lower halves of the loop are symmetric relative to one another.

In another feature of this aspect, an upper portion of the elastic metal wire is arranged to cross over a lower portion of the elastic metal wire in at least one location along the loop, and each pair of upper and lower portions defines a respective one of the lobe pairs. In a further feature, the two continuous runs of the elastic metal wire are symmetric relative to one another.

In another feature of this aspect, the first and second ends of the loop are connected by two continuous runs of the elastic metal wire, and the two continuous runs alternately cross over each other such that a first of the two continuous runs forms the upper lobe of a first lobe pair and the lower lobe of a second lobe pair that is immediately adjacent the first lobe pair, such that a second of the two continuous runs forms the lower lobe of the first lobe pair and the upper lobe of the second lobe pair. In a further feature, the two continuous runs of the elastic metal wire are symmetric relative to one another.

In another feature of this aspect, the plurality of lobe pairs includes at least (i) a first lobe pair, defining a first loop segment, that is adapted to be positioned around the first bracket, (ii) a second lobe pair, defining a second loop segment, that is adapted to be positioned around the second bracket, and (iii) a third lobe pair, defining a third loop segment, that is adapted to be positioned around a third bracket located between the first and second brackets. In further features, a pitch between the first loop segment and the second loop segment is the same as a pitch between the second loop segment and the third loop segment; a pitch between each loop segment and the loop segment adjacent thereto is the same; and/or the plurality of lobe pairs includes between four and eight lobe pairs, inclusive.

In another feature of this aspect, the metal wire is formed from a nitinol alloy. In a further feature, the metal wire is formed from a copper-nitinol alloy.

In another feature of this aspect, the metal wire is formed from a shape-memory alloy.

Broadly defined, the present invention according to another aspect relates to a method of using an orthodontic device to effect lateral movement of at least one tooth, including: providing a closed loop that is formed from a metal wire having elastic properties, wherein the loop has a first end, a second end, and a plurality of lobe pairs arranged along a length between the first and second ends, wherein each lobe pair includes an upper lobe and a lower lobe; hooking the first end of the loop around a first bracket of a plurality of orthodontic brackets, wherein the first bracket is attached to a first tooth in a first jaw, wherein the first jaw is an upper jaw or a lower jaw, and wherein an archwire is arranged around the first jaw; stretching the loop and hooking the second end thereof around a second bracket of a plurality of orthodontic brackets, wherein the second bracket is attached to a second tooth in the first jaw; wherein, when stretched and hooked, the loop is placed in tension between the first and second brackets, and wherein each successive lobe pair of the plurality of lobe pairs defines a loop segment that is positioned around a successive bracket, of the plurality of orthodontic brackets, along the first jaw, such that the loop applies a compressive force to the brackets to effect lateral movement of at least one tooth.

In a feature of this aspect, the loop has an upper half and a lower half, wherein the upper lobes are all arranged in the upper half of the loop in a continuous run of the elastic metal wire from the first end to the second end, and wherein the lower lobes are all arranged in the lower half of the loop in a continuous run of the elastic metal wire from the first end to the second end. In further features, lowermost portions of the upper lobes approach uppermost portions of the lower lobes but do not make contact with or cross over each other; lowermost portions of the upper lobes make contact with uppermost portions of the lower lobes but do not cross over each other; lowermost portions of the upper lobes slightly overlap uppermost portions of the lower lobes; and/or the upper and lower halves of the loop are symmetric relative to one another.

In another feature of this aspect, an upper portion of the elastic metal wire is arranged to cross over a lower portion of the elastic metal wire in at least one location along the loop, wherein each pair of upper and lower portions defines a respective one of the lobe pairs. In a further feature, the two continuous runs of the elastic metal wire are symmetric relative to one another.

In another feature of this aspect, the first and second ends of the loop are connected by two continuous runs of the elastic metal wire, and the two continuous runs alternately cross over each other such that a first of the two continuous runs forms the upper lobe of a first lobe pair and the lower lobe of a second lobe pair that is immediately adjacent the first lobe pair, such that a second of the two continuous runs forms the lower lobe of the first lobe pair and the upper lobe of the second lobe pair. In a further feature, the two continuous runs of the elastic metal wire are symmetric relative to one another.

In another feature of this aspect, the plurality of lobe pairs includes at least (i) a first lobe pair, defining a first loop segment, positioned around the first bracket, (ii) a second lobe pair, defining a second loop segment, positioned around the second bracket, and (iii) a third lobe pair, defining a third loop segment, positioned around a third bracket located between the first and second brackets. In further features, a pitch between the first loop segment and the second loop segment is the same as a pitch between the second loop segment and the third loop segment; a pitch between each loop segment and the loop segment adjacent thereto is the same; and/or the plurality of lobe pairs includes between four and eight lobe pairs, inclusive.

In another feature of this aspect, the metal wire is formed from a nitinol alloy. In a further feature, the metal wire is formed from a copper-nitinol alloy.

In another feature of this aspect, the metal wire is formed from a shape-memory alloy.

In another feature of this aspect, the method further includes a preliminary step of selecting the closed loop from a plurality of closed loops of different sizes. In further features, the step of selecting the closed loop from a plurality of closed loops of different sizes includes selecting the closed loop from a plurality of closed loops having different numbers of loop segments; and/or selecting the closed loop from a plurality of closed loops of different sizes includes selecting the closed loop from a plurality of closed loops having the same number of loop segments but a different pitch between adjacent loop segments.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 1 is a front view of portions of an exemplary prior art orthodontic system installed on upper and lower dental arches;

FIG. 2 is a front perspective view of an orthodontic device for closing lateral spaces between teeth in a dental arch, shown in its relaxed or inactive state, in accordance with one or more preferred embodiments of the present invention;

DETAILED DESCRIPTION

Figure 3:
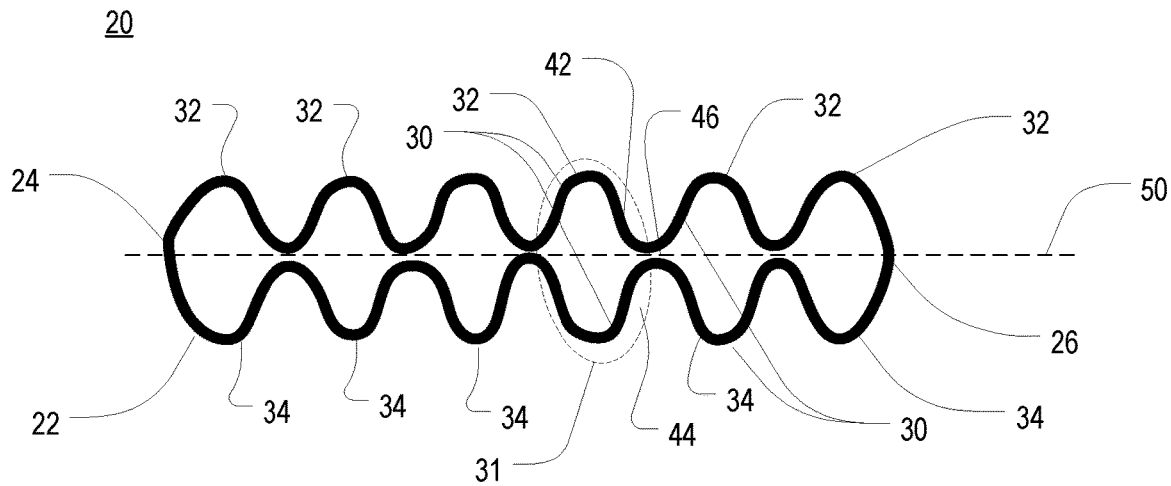
FIG. 3 is a rear view of the orthodontic device of FIG. 2.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 2 is a front perspective view of an orthodontic device 20 for closing lateral spaces between teeth 10 in a dental arch 14, 15, shown in its relaxed or inactive state, in accordance with one or more preferred embodiments of the present invention, and FIG. 3 is a front view of the orthodontic device 20 of FIG. 2. As shown therein, the device 20 includes one or more elements of metal wire 22 formed into an elongated, closed, elastic loop having two ends 24, 26 and a plurality of lobe pairs 30 along its length. Each lobe pair includes an upper lobe 32 and a lower lobe 34. Between each lobe pair 30 and the lobe pair or pairs 30 adjacent thereto, an upper portion of the wire 42 approaches a lower portion of the wire 44 at an intersection point 46 so as to arrange or segment each lobe pair 30 into a separate loop segment 31. In the illustrated embodiment, the upper and lower portions of the wire 42, 44 do not quite reach each other at the intersection points 46, but in various alternative embodiments, the upper and lower portions 42, 44 may contact each other and/or overlap each other at some or all of the intersection points 46.

In at least some embodiments, each of the one or more wire elements that is used is produced from some sort of shape-memory alloy, and is preferably produced from a superelastic metal, such as nickel-titanium ("NiTi" or "nitinol"), copper nitinol, alloys thereof, or the like. This material, coupled with the serpentine path of each of the upper and lower wire portions 42, 44, permits the device 20 to be stretched or "activated," like a spring, to a greater length. In various embodiments, the spring exerts 1-300 g of pull force as it collapses from its stretched or "active" state back to its inactive state. Preferably, the spring exerts approximately 20-200 g of pull force as it collapses from its stretched or "active" state back to its inactive state, and more preferably, the spring exerts approximately 40-100 g of pull force as it collapses from its stretched or "active" state back to its inactive state.

Figure 4:
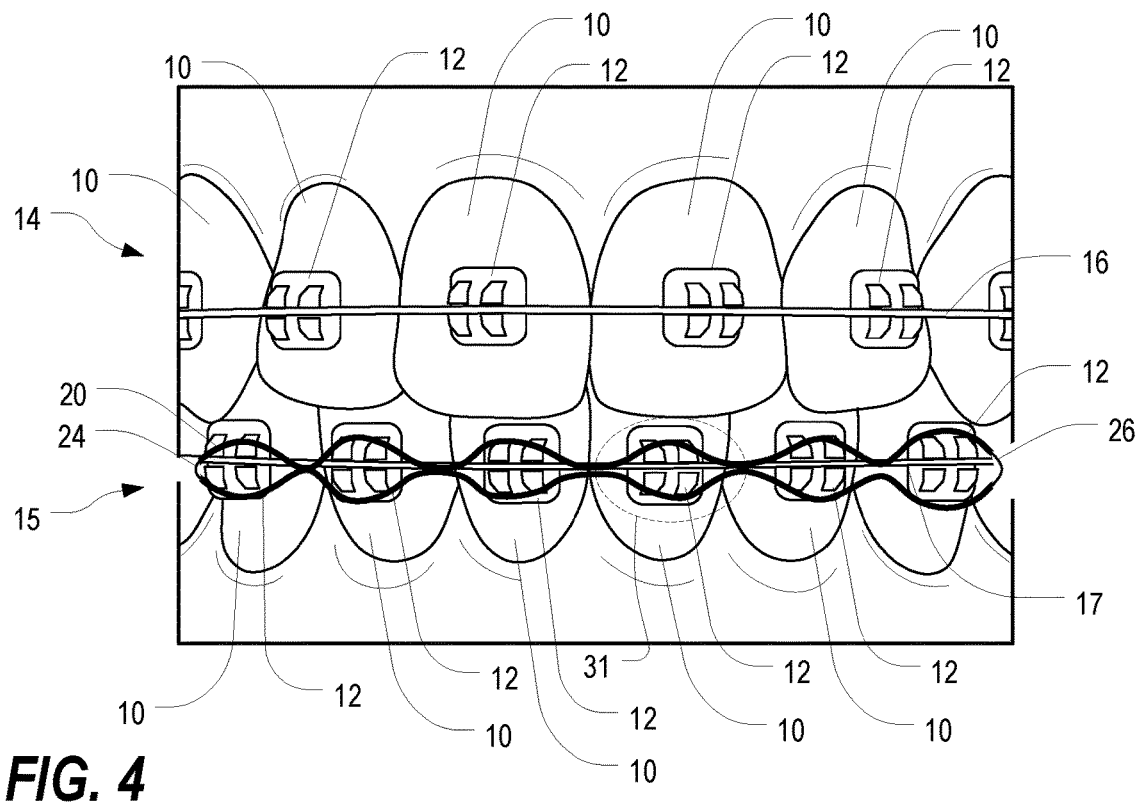
FIG. 4 is a front view of the device of FIGS. 2 and 3 installed on the brackets mounted on the teeth of a patient's lower arch.

FIG. 4 is a front view of the device 20 of FIGS. 2 and 3 installed on the brackets 12 mounted on the teeth 10 of a patient's lower arch 15. During installation, the first end 24 of the device 20 is positioned or "hooked" around a selected bracket 12 or portion thereof on the upper or lower arch 14, 15 (here, the lower arch 15). The device 20 is then stretched or activated such that each successive loop segment 31 is positioned around a successive bracket 12 in the arch, and the second end 26 of the device 20 is positioned around the final bracket 12 and released such that it remains "hooked" there. At this point, the loop is held in tension between the endmost brackets 12 via the natural bias of the loop. In this activated state, the loop applies an orthodontically-friendly compressive force to the teeth 10 as it shrinks back toward the original, unstretched length of its relaxed or inactive state.

As with elastomeric chains, the compressive force causes the teeth 10 and brackets 12 to slide along the orthodontic archwire 17, bringing the teeth 10 together and closing any spaces that are present between them. However, the force applied by superelastic metal remains much more constant than that applied by conventional elastomeric chains (weeks instead of days). It is thus possible to reduce the frequency with which a patient must return to the orthodontist for adjustment. Furthermore, because the force applied by the superelastic metal is more consistent, use of the device 20 is more comfortable for the patient than the heavy, inconsistent forces applied by conventional elastomeric chains. Advantageously, the non-porous nature of the wire surfaces helps prevent plaque buildup, which promotes better oral hygiene, as well as facilitating longer periods between adjustment than are appropriate with conventional elastomeric chains and the plaque that readily builds on them.

Figure 5:
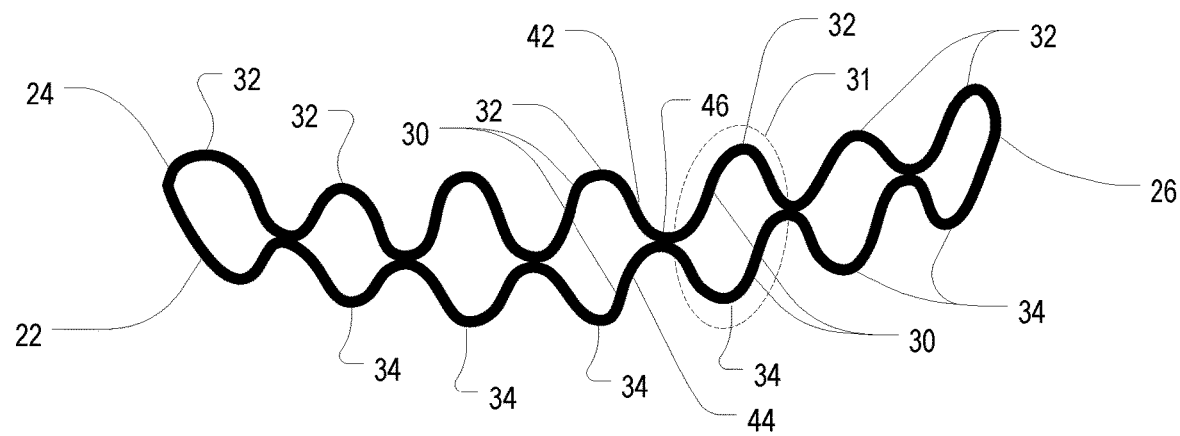
FIG. 5 is a front perspective view of an orthodontic device similar to that of FIG. 2 but which has seven loop segments.
Figure 6:
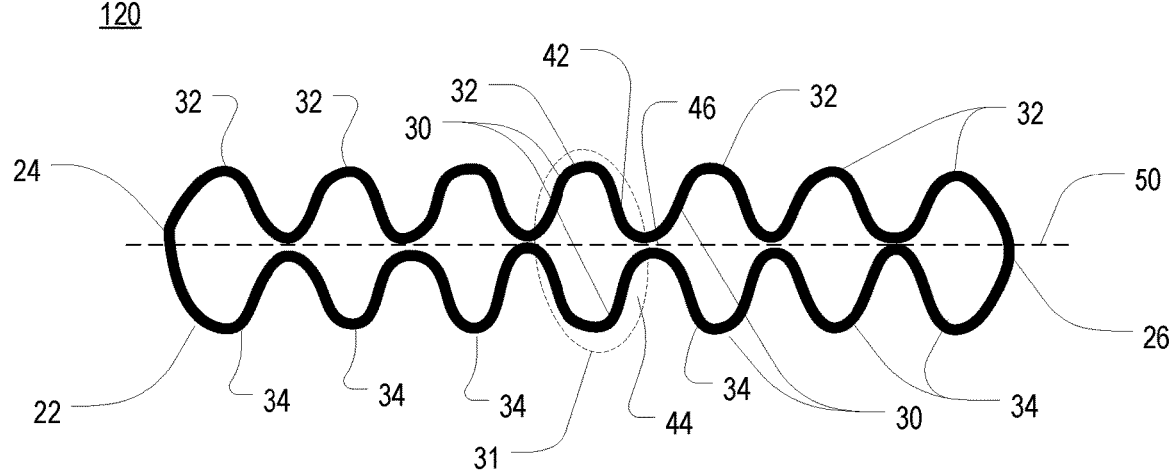
FIG. 6 is a rear view of the orthodontic device of FIG. 5.

In at least some embodiments, the upper and lower lobe 32,34 in each loop segment 31 are symmetric to each other with respect to a center line 50 as shown in FIG. 3. The loop segments 31 are preferably linearly aligned with each other along the center line 50 such that the device 20 itself may be aligned along the brackets 12 of an upper or lower arch 14,15 and the archwire 16,17 that is routed therethrough. Notably, the number of loop segments 31 may vary considerably. FIGS. 2-4 illustrate a device 20 with only six loop segments 31, while FIGS. 5 and 6 are a front perspective view and a rear view, respectively, of a similar orthodontic device 120 that has seven loop segments 31. Generally, the number of loop segments 31 may vary from two to sixteen, with typical lengths involving between four and eight loop segments 31.

Also in at least some embodiments, the pitch between adjacent loop segments 31 is generally uniform within each device 20,120, but the pitch may vary slightly from one device to another. Different pitch sizes may be used, for example, for different jaw sizes and teeth spacings and/or to provide different amounts of force when applied to a row of brackets 12 in an upper or lower arch 14,15.

Figure 7:
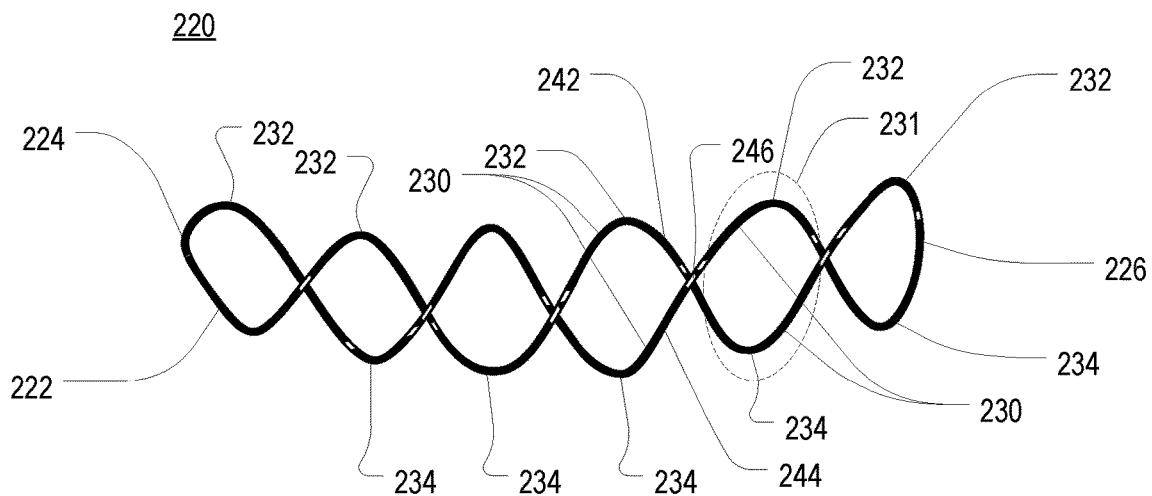
FIG. 7 is a front perspective view of an alternative orthodontic device for closing lateral spaces between teeth in a dental arch, shown in its relaxed or inactive state, in accordance with one or more preferred embodiments of the present invention.

In some embodiments, a device with loop segments may have an alternative construction. For example, FIG. 7 is a front perspective view of an alternative orthodontic device 220 for closing lateral spaces between teeth 10 in a dental arch 14,15, shown in its relaxed or inactive state, in accordance with one or more preferred embodiments of the present invention. As shown therein, the device 220 includes one or more elements of metal wire 222 formed into an elongated, closed, elastic loop having two ends 224,226 and a plurality of lobe pairs 230 along its length. Each lobe pair includes an upper lobe 232 and a lower lobe 234. Between each lobe pair 230 and the lobe pair or pairs 230 adjacent thereto, an upper portion of the wire 242 crosses over a lower portion of the wire 244 at an intersection point 246 so as to arrange or segment each lobe pair 230 into a separate loop segment 231. After crossing over the lower wire portion 244 of one loop segment 231, the upper wire portion 242 continues on to become the lower wire portion 244 for the next loop segment 231, and vice versa.

Figure 8:
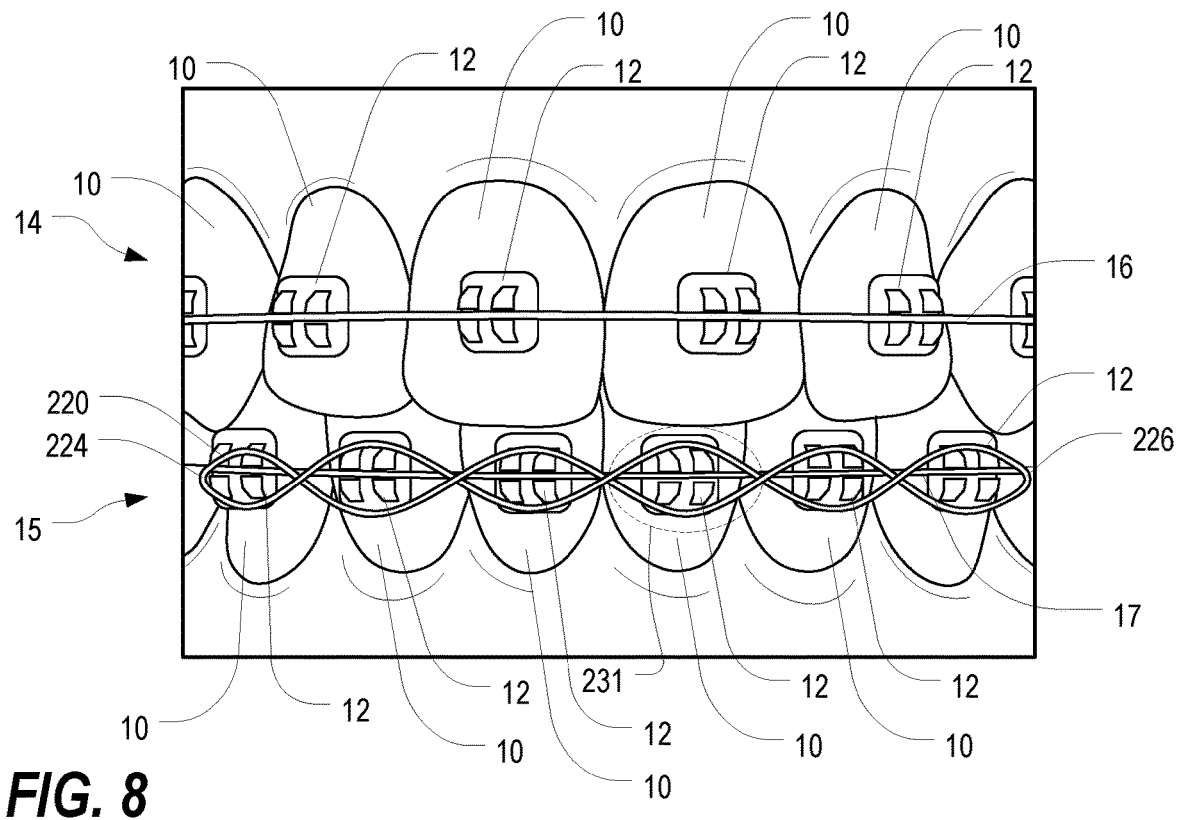
FIG. 8 is a front view of the device of FIG. 7 installed on the brackets mounted on the teeth of a patient's lower arch.

FIG. 8 is a front view of the device 220 of FIG. 7 installed on the brackets 12 mounted on the teeth 10 of a patient's lower arch 15. During installation, the first end 224 of the device 220 is positioned or "hooked" around a selected bracket 12 or portion thereof on the upper or lower arch 14,15 (here, the lower arch 15). The device 220 is then stretched or activated such that each successive loop segment 230 is positioned around a successive bracket 12 in the arch, and the second end 226 of the device 220 is positioned around the final bracket 12 and released such that it remains "hooked" there. As with the device 20 of FIG. 4, the loop is held in tension between the endmost brackets 12 via the natural bias of the loop. In this activated state, the loop applies an orthodontically-friendly compressive force to the teeth 10 as it shrinks back toward the original, unstretched length of its relaxed or inactive state.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. An orthodontic system, comprising:
(a) a plurality of orthodontic brackets, including a first bracket that is attached to a first tooth in a first jaw, the first jaw being an upper or lower jaw, and a second bracket that is attached to a second tooth in the first jaw;
(b) an archwire that is arranged around the first jaw and coupled to the first and second brackets; and
(c) a single continuous length of metal wire, having elastic properties, wherein:
 (i) the single continuous length of metal wire has a first U-shaped end that is hooked around the first bracket such that a first leg of the first U-shaped end is an upper portion that extends over the first bracket and a second leg of the first U-shaped end is a lower portion that extends under the first bracket,
 (ii) the single continuous length of metal wire continues from the first leg, of the first U-shaped end, in a first serpentine path that is defined by a first plurality of lobes of the wire such that each lobe of the first plurality of lobes extends over a respective bracket, including the first and second brackets, of the plurality of orthodontic brackets,
 (iii) the single continuous length of metal wire continues from the second leg, of the first U-shaped end, in a second serpentine path that is defined by a second plurality of lobes of the wire such that each lobe of the second plurality of lobes extends under a respective bracket, including the first and second brackets, of the plurality of orthodontic brackets,
 (iv) the wire of the second serpentine path has no connection to the wire of the first serpentine path,
 (v) the wire of the first serpentine path continues to form a first leg of a second U-shaped end of the single continuous length of metal wire, and the wire of the second serpentine path continues to form a second leg of the second U-shaped end of the single continuous length of metal wire,
 (vi) the second U-shaped end of the loop is stretched and hooked around the second bracket, with the first leg of the second U-shaped end extending over the second bracket and the second leg of the second U-shaped end extending under the second bracket, thereby placing the loop in tension between the first and second brackets, (vii) each lobe of the first serpentine path of the upper portion of the single continuous length of metal wire is generally aligned with, and forms half of a lobe pair with, a respective corresponding lobe of the second serpentine path of the lower portion of the single continuous length of metal wire, and (viii) each successive lobe pair defines a loop segment that is positioned around a successive bracket, of the plurality of orthodontic brackets, along the first jaw.

2. The orthodontic system of claim 1, wherein the lobes of the first plurality of lobes descend toward and approach the lobes of the second plurality of lobes, and the lobes of the second plurality of lobes ascend toward and approach the lobes of the first plurality of lobes, but the lobes of the second plurality of lobes and the lobes of the first plurality of lobes do not make contact with each other and do not cross over each other.

3. The orthodontic system of claim 1, wherein the lobes of the first plurality of lobes descend toward and make contact with the lobes of the second plurality of lobes, and the lobes of the second plurality of lobes ascend toward and make contact with the lobes of the first plurality of lobes, but the lobes of the second plurality of lobes and the lobes of the first plurality of lobes do not cross over each other.

4. The orthodontic system of claim 1, wherein the lobes of the first plurality of lobes descend toward and overlap the lobes of the second plurality of lobes, and the lobes of the second plurality of lobes ascend toward and overlap the lobes of the first plurality of lobes.

5. The orthodontic system of claim 1, wherein the lobes of the first plurality of lobes and the lobes of the second plurality of lobes are symmetric relative to one another.

6. The orthodontic system of claim 1, wherein the first and second serpentine paths of the elastic metal wire are symmetric relative to one another.

7. The orthodontic system of claim 1, wherein the lobe pairs include at least (i) a first lobe pair, defining a first loop segment, positioned around the first bracket, (ii) a second lobe pair, defining a second loop segment, positioned around the second bracket, and (iii) a third lobe pair, defining a third loop segment, positioned around a third bracket located between the first and second brackets.

8. The orthodontic system of claim 7, wherein a pitch between the first loop segment and the second loop segment is the same as a pitch between the second loop segment and the third loop segment.

9. The orthodontic system of claim 7, wherein a pitch between each loop segment and the loop segment adjacent thereto is the same.

10. The orthodontic system of claim 7, wherein the plurality of lobe pairs includes between four and eight lobe pairs, inclusive.

11. The orthodontic system of claim 1, wherein the metal wire is formed from a nitinol alloy.

12. The orthodontic system of claim 11, wherein the metal wire is formed from a copper-nitinol alloy.

13. The orthodontic system of claim 1, wherein the metal wire is formed from a shape-memory alloy.

14. The orthodontic system of claim 1, wherein the closed loop exerts 1-300 g of pull force as it collapses from a stretched or "active" state back to an inactive state.

15. The orthodontic system of claim 14, wherein the closed loop exerts approximately 20-200 g of pull force as it collapses from its stretched or "active" state back to its inactive state.

16. The orthodontic system of claim 15, wherein the closed loop exerts approximately 40-100 g of pull force as it collapses from its stretched or "active" state back to its inactive state.

17. The orthodontic system of claim 1, wherein the lobes of the first plurality of lobes are all arranged in an upper half of the loop in a first continuous run of the elastic metal wire from the first end to the second end, and wherein the lobes of the second plurality of lobes are all arranged in a lower half of the loop in a second continuous run of the elastic metal wire from the first end to the second end.

18. The orthodontic system of claim 17, wherein the loop is an elongated loop defining a center axis, wherein the first continuous run of the elastic metal wire is disposed at or above the center axis, and wherein the second continuous run of the elastic metal wire is disposed at or below the center axis.

19. An orthodontic system, comprising:
(a) a plurality of orthodontic brackets, including a first bracket that is attached to a first tooth in a first jaw, the first jaw being an upper or lower jaw, and a second bracket that is attached to a second tooth in the first jaw;
(b) an archwire that is arranged around the first jaw and coupled to the first and second brackets; and
(c) a single continuous closed loop of a metal wire, having elastic properties, wherein:
  (i) the loop is an elongated loop having an upper portion and a lower portion,
  (ii) the upper portion and the lower portion each extend between a first end of the loop and a second end of the loop,
  (iii) the upper portion comprises a first continuous length of the wire arranged in a serpentine form that is defined by a first plurality of lobes of the wire,
  (iv) the lower portion comprises a second continuous length of the wire arranged in a serpentine form that is defined by a second plurality of lobes of the wire,
  (v) the first and second continuous lengths of the wire are continuous with each other, but have no connections therebetween except at the first and second ends, and
  (vi) each lobe of the upper portion is generally aligned with, and forms half of a lobe pair with, a respective corresponding lobe of the lower portion; and
(d) wherein the first end of the loop is hooked around the first bracket and the second end of the loop is stretched and hooked around the second bracket, thereby placing the loop in tension between the first and second brackets;
(e) wherein each successive lobe pair of the plurality of lobe pairs defines a loop segment that is positioned around a successive bracket, of the plurality of orthodontic brackets, along the first jaw such that the first continuous length of the wire passes over all of the brackets and the second continuous length of the wire passes under all of the brackets of the plurality of brackets.

20. An orthodontic device for use in an orthodontic system, the orthodontic system having a plurality of orthodontic brackets including a first bracket attached to a first tooth in a first jaw, the first jaw being an upper or lower jaw, a second bracket attached to a second tooth in the first jaw, and an archwire that is arranged around the first jaw and coupled to the first and second brackets, the orthodontic device comprising:
- (a) a single continuous closed loop of a metal wire, having elastic properties, that is hooked around the first bracket at a first end of the loop and is stretched and hooked around the second bracket at a second end of the loop, wherein:
  - (i) an upper portion of the single continuous closed loop of wire extends from a top of the first bracket to a top of the second bracket and over all brackets from the first bracket to the second bracket along the archwire,
  - (ii) a lower portion of the single continuous closed loop of wire extends from a bottom of the first bracket to a bottom of the second bracket and under all brackets from the first bracket to the second bracket along the archwire,
  - (iii) the upper portion and the lower portion each comprise a single respective length of the wire that has no connection with the other single respective length of the wire except for being continuous therewith at the first and second ends,
  - (iv) each single respective length of the wire is arranged in a serpentine form that is defined by a plurality of lobes of the wire, and
  - (iv) each lobe of the upper portion is generally aligned with, and forms half of a lobe pair with, a respective corresponding lobe of the lower portion;

wherein each successive lobe pair of the plurality of lobe pairs defines a loop segment that is positioned around a successive bracket, of the plurality of orthodontic brackets, along the first jaw.

* * * * *